(12) United States Patent
Bolukbasi et al.

(10) Patent No.: US 11,066,172 B2
(45) Date of Patent: Jul. 20, 2021

(54) CONTROLLED ENERGY ABSORPTION OF SEATS FOR IMPACT

(71) Applicant: The Boeing Company, Chicago, IL (US)

(72) Inventors: Akif O. Bolukbasi, Mesa, AZ (US); Terrence S. Birchette, Chandler, AZ (US); Justin Johnson Schaub, Gilbert, AZ (US)

(73) Assignee: The Boeing Company, Chicago, IL (US)

( * ) Notice: Subject to any disclaimer, the term of this patent is extended or adjusted under 35 U.S.C. 154(b) by 927 days.

(21) Appl. No.: 14/883,912

(22) Filed: Oct. 15, 2015

(65) Prior Publication Data

US 2017/0106981 A1 Apr. 20, 2017

(51) Int. Cl.
| | | |
|---|---|---|
| *B64D 25/02* | (2006.01) | |
| *B64D 11/06* | (2006.01) | |
| *B60N 2/42* | (2006.01) | |
| *B60R 21/015* | (2006.01) | |
| *B64D 25/04* | (2006.01) | |
| *G01G 19/08* | (2006.01) | |
| *G01G 19/44* | (2006.01) | |

(Continued)

(52) U.S. Cl.
CPC ........ *B64D 11/0619* (2014.12); *B60N 2/4242* (2013.01); *B60R 21/015* (2013.01); *B64D 25/04* (2013.01); *G01G 19/08* (2013.01); *G01G 19/44* (2013.01); *B64C 25/58* (2013.01); *B64D 45/06* (2013.01); *B64D 2045/008* (2013.01)

(58) Field of Classification Search
CPC ...... B60N 2/4242; B60N 2/4207; B60N 2/42; B60R 21/015; B64D 11/0619
USPC ............... 701/36–37, 45, 124; 73/65.06, 65; 340/946, 951; 297/216.1, 217.1, 217.2, 297/301; 248/562, 566, 550
See application file for complete search history.

(56) References Cited

U.S. PATENT DOCUMENTS

| | | |
|---|---|---|
| 4,408,738 A | 10/1983 | Mazelsky |
| 4,535,877 A | 8/1985 | Shimokura |

(Continued)

FOREIGN PATENT DOCUMENTS

| | | | | |
|---|---|---|---|---|
| CA | 2947906 A1 | * | 11/2015 | ............. F16F 9/325 |
| CN | 101427050 | | 5/2009 | |

(Continued)

OTHER PUBLICATIONS

Power absorption by closely spaced point absorbers in constrained conditions; G. De Backer; M. Vantorre; C. Beels; J. De Rouck; P. Frigaard; IET Renewable Power Generation; Year: 2010, vol. 4, Issue: 6; pp. 579-591, DOI: 10.1049/iet-rpg.2009.0188.*

(Continued)

*Primary Examiner* — Cuong H Nguyen

(74) *Attorney, Agent, or Firm* — Hanley, Flight & Zimmerman

(57) ABSTRACT

Controlled energy absorption of seats for impact is described herein. One disclosed example method includes determining a weight of an occupant of a seat of an aircraft, and calculating, using a processor, a stroke load of a seat energy absorber operatively coupled to the seat based on the weight of the occupant. The example method also includes setting the seat energy absorber to the calculated stroke load.

13 Claims, 14 Drawing Sheets

(51) Int. Cl.
  *B64C 25/58* (2006.01)
  *B64D 45/00* (2006.01)
  *B64D 45/06* (2006.01)

(56) References Cited

U.S. PATENT DOCUMENTS

| | | | |
|---|---|---|---|
| 4,696,489 A | 9/1987 | Fujishiro et al. | |
| 5,139,119 A | 8/1992 | Karnopp | |
| 5,165,868 A | 11/1992 | Gergets et al. | |
| 5,303,804 A | 4/1994 | Spiess | |
| RE34,628 E | 6/1994 | Fujishiro et al. | |
| 5,388,614 A | 2/1995 | Hakamada et al. | |
| 5,401,052 A | 3/1995 | Yoshioka et al. | |
| H1833 H | 2/2000 | Hoppel et al. | |
| 6,120,009 A | 9/2000 | Gatehouse et al. | |
| 6,328,259 B1 | 12/2001 | Bolukbasi | |
| 6,389,341 B1 | 5/2002 | Davis | |
| 7,720,582 B2 | 5/2010 | Makinadjian | |
| 7,822,522 B2* | 10/2010 | Wereley | B60N 2/4242 188/267.1 |
| 7,866,606 B2* | 1/2011 | Peck | B64D 25/04 244/122 R |
| 7,878,312 B2* | 2/2011 | Hiemenz | B60N 2/4242 188/267.2 |
| 8,401,740 B2* | 3/2013 | Hiemenz | B60N 2/4242 701/45 |
| 8,473,163 B2* | 6/2013 | Hiemenz | F16F 15/02 701/45 |
| 8,886,402 B1* | 11/2014 | Lou | B64C 25/60 188/266 |
| 8,991,340 B2 | 3/2015 | Zuleger et al. | |
| 8,991,569 B1 | 3/2015 | Lou et al. | |
| 9,708,057 B2 | 7/2017 | Birchette et al. | |
| 2003/0056997 A1* | 3/2003 | Breed | B60N 2/002 177/144 |
| 2006/0224285 A1 | 10/2006 | Izawa et al. | |
| 2006/0226289 A1 | 10/2006 | Robbins et al. | |
| 2007/0051850 A1* | 3/2007 | Peck | B64D 25/04 244/122 R |
| 2007/0109111 A1* | 5/2007 | Breed | B60N 2/2863 340/435 |
| 2007/0152803 A1* | 7/2007 | Huang | B60Q 1/525 340/435 |
| 2007/0235911 A1 | 10/2007 | Robbins et al. | |
| 2007/0278723 A1* | 12/2007 | Shoemaker | B60N 2/501 267/131 |
| 2008/0015753 A1* | 1/2008 | Wereley | B60N 2/4242 701/45 |
| 2008/0156602 A1* | 7/2008 | Hiemenz | B60N 2/4242 188/267.1 |
| 2008/0195261 A1* | 8/2008 | Breed | B60R 21/0132 701/2 |
| 2010/0017057 A1 | 1/2010 | Izawa et al. | |
| 2010/0179730 A1* | 7/2010 | Hiemenz | B60N 2/4242 701/45 |
| 2010/0230989 A1 | 9/2010 | Cantor et al. | |
| 2011/0024601 A1 | 2/2011 | Shoemaker et al. | |
| 2011/0035118 A1* | 2/2011 | Hiemenz | B64D 11/0689 701/45 |
| 2012/0223551 A1 | 9/2012 | Amante et al. | |
| 2013/0197755 A1 | 8/2013 | Otake et al. | |
| 2014/0077519 A1 | 3/2014 | Cantor et al. | |
| 2014/0203602 A1 | 7/2014 | Robbins et al. | |
| 2015/0041584 A1 | 2/2015 | Lu et al. | |
| 2015/0239554 A1 | 8/2015 | Birchette et al. | |
| 2016/0086391 A1* | 3/2016 | Ricci | G07C 5/008 701/29.3 |
| 2016/0121765 A1* | 5/2016 | Desjardins | B60N 2/24 701/49 |
| 2017/0297684 A1 | 10/2017 | Birchette et al. | |
| 2018/0050794 A1 | 2/2018 | Bolukbasi et al. | |

FOREIGN PATENT DOCUMENTS

| | | | |
|---|---|---|---|
| CN | 101428689 | 5/2009 | |
| EP | 0075067 | 3/1983 | |
| EP | 3140565 A1 * | 3/2017 | F16F 9/46 |
| WO | 2011060061 | 5/2011 | |
| WO | 2013120142 | 8/2013 | |
| WO | WO-2015168790 A1 * | 11/2015 | B60N 2/52 |

OTHER PUBLICATIONS

Design of inter-city transport aircraft powered by fuel cell & flight test of zero emission 2-seater aircraft powered by fuel cells; Giulio Romeo; Fabio Borello; Enrico Cestino;2012 Electrical Systems for Aircraft, Railway and Ship Propulsion; Year: 2012; pp. 1-7, DOI: 10.1109/ESARS.2012.6387492; Referenced in: IEEE Conference Publications.*

Preparations for a train-to-train impact test of crash-energy management passenger rail equipment; D. Tyrell; K. Jacobsen; D. Parent; Proceedings of the 2005 ASME/IEEE Joint Rail Conference, 2005; Year: 2005; pp. 107-116, DOI: 10.1109/RRCON.2005.186063.*

Modeling and simulation of an advanced intelligent restraint system; Mohannad Murad; Manohar Das; Ka C. Cheok; 2009 3rd Annual IEEE Systems Conference; Year: 2009; pp. 333-337, DOI: 10.1109/SYSTEMS.2009.4815822.*

The All-Electric Fighter Airplane Flight Control Issues, Capabilities, and Projections J. B. Leonard; IEEE Transactions on Aerospace and Electronic Systems; Year: 1984, vol. AES-20, Issue: 3; pp. 234-242.*

Design, fabrication, and experiments of an electromagnetic actuator for flapping wing micro air vehicles Jesse A. Roll; Bo Cheng; Xinyan Deng;2013 IEEE International Conference on Robotics and Automation Year: 2013; pp. 809-815.*

Detail and experimental results of ferromagnetic levitation system of Japan air lines HSST-01/-02 vehicles; . Hikasa; Y. Takeuchi IEEE Transactions on Vehicular Technology; Year: 1980, vol. 29, Issue: 1; pp. 35-41.*

Automatic Detection of Compensation During Robotic Stroke Rehabilitation Therapy;Ying Xuan Zhi et al.; IEEE Journal of Translational Engineering in Health and Medicine; vol. 6; rticle Sequence No. 2100107; IEEE Journals & Magazine; year 2018.*

A seat microvalve nozzle for optimal gas flow capacity at large controlled pressure; W. van der Wijngaart; A. Thorsen ; G. Stemme 17th IEEE International Conference on Micro Electro Mechanical Systems. Maastricht MEMS 2004 Technical Digest;pp. 233-236; IEEE Conferences; year 2004.*

Altered steering strategies for goal-directed locomotion in stroke; Ala' Sami Aburub et al.; 2011 International Conference on Virtual Rehabilitation; pp. 1-2; year 2011.*

European Patent Office, "Extended European Search Report", issued in connection with European Patent Application No. 16193736.2, dated Apr. 7, 2017 (10 pages).

United States Patent and Trademark Office, "Final Office action," issued in connection with U.S. Appl. No. 15/637,645, dated Feb. 12, 2018, 6 pages.

United States Patent and Trademark Office, "Non-Final Office action," issued in connection with U.S. Appl. No. 15/637,645, dated Sep. 14, 2017, 6 pages.

European Patent Office, "Extended European Search Report," issued in connection with European Patent Application No. 15153229.8, dated Jul. 16, 2015, 8 pages.

United States Patent and Trademark Office, "Restriction Requirement," issued in connection with U.S. Appl. No. 14/188,589, dated Oct. 26, 2015, 6 pages.

United States Patent and Trademark Office, "Non-Final Office action," issued in connection with U.S. Appl. No. 14/188,589, dated Feb. 16, 2016, 14 pages.

United States Patent and Trademark Office, "Final Office action," issued in connection with U.S. Appl. No. 14/188,589, dated Jun. 2, 2016, 22 pages.

(56) References Cited

OTHER PUBLICATIONS

United States Patent and Trademark Office, "Advisory action," issued in connection with U.S. Appl. No. 14/186,589, dated Aug. 17, 2016, 4 pages.

United States Patent and Trademark Office, "Non-final Office action," issued in connection with U.S. Appl. No. 14/188,589, dated Oct. 14, 2016, 17 pages.

United States Patent and Trademark Office, "Notice of Allowance," issued in connection with U.S. Appl. No. 14/188,589, dated Mar. 6, 2017, 9 pages.

United States Patent and Trademark Office, "Notice of Allowance," issued in connection with U.S. Appl. No. 15/637,645, dated Apr. 19, 2018, 12 pages.

United States Patent and Trademark Office, "Non-final Office action," issued in connection with U.S. Appl. No. 15/239,294, dated May 18, 2018, 23 pages.

European Patent Office, "Communication pursuant to Article 94(3) EPC," issued in connection with International Application No. 16 193 736.2, dated Feb. 7, 2018, 4 pages.

European Patent Office, "Communication Pursuant to Article 94(3) EPC," issued in connection with European Application No. 16193736.2, dated Mar. 1, 2019, 5 pages.

United States Patent and Trademark Office, "Non-Final Office Action," issued in connection with U.S. Appl. No. 15/239,294, dated Mar. 7, 2019, 16 pages.

United States Patent and Trademark Office, "Notice of Allowance and Fee(s) Due," issued in connection with U.S. Appl. No. 15/239,294, dated Jun. 19, 2019, 15 pages.

Japan Patent Office, "Notice of Reasons for Rejection," issued in connection with Japanese Patent Application No. 2016-200800, dated Nov. 7, 2020, 8 pages. English version included.

National Intellectual Property Administration, PRC, "Notification of First Office Action," issued in connection with Chinese Patent Application No. 201610837701X, dated Oct. 23, 2020, 15 pages. English translation included.

United States Patent and Trademark Office, "Notice of Allowance and Fee(s)," issued in connection with U.S. Appl. No. 15/953,126, dated Nov. 5, 2020, 5 pages.

Federal Service for Intellectual Property, "Notification of Results of Assessment of Patentability of the Invention," issued in connection with Russian Patent Application No. 2016131230, dated Dec. 9, 2019, 11 pages. English version included.

United States Patent and Trademark Office, "Final Office action," issued in connection with U.S. Appl. No. 15/239,294, dated Dec. 3, 2018, 23 pages.

United States Patent and Trademark Office, "Advisory action," issued in connection with U.S. Appl. No. 15/239,294, dated Jan. 22, 2019, 3 pages.

National Intellectual Property Administration, PRC, "Notification of Second Office Action," issued in connection with Chinese Patent Application No. 201610837701X, dated Mar. 3, 2021, 13 pages English translation included.

\* cited by examiner

US 11,066,172 B2

CONTROLLED ENERGY ABSORPTION OF SEATS FOR IMPACT

STATEMENT REGARDING FEDERALLY SPONSORED RESEARCH OR DEVELOPMENT

This disclosure was made with Government support under contract number W911W6-10-2-0003 awarded by the Department of Defense. The government has certain rights in this disclosure.

FIELD OF THE DISCLOSURE

This patent relates generally to seats and, more particularly, to controlled energy absorption of seats for impact.

BACKGROUND

Some known vehicle seat energy absorbers (e.g., energy absorbers for aircraft, rotorcraft, etc.) are configured to stroke (e.g., displace) at a fixed load during a crash impact. In particular, known seat energy absorbers displace at a nominal seat stroke load based on anthropometric data of an average occupant (e.g., the $50^{th}$ percentile of height and/or weight), a nominal available seat stroke length (e.g., available displacement of a seat) and/or a specific designed-for crash impact condition (a specific crash impact scenario).

Variations in individual seat occupant anthropometric data, which can include both weight and/or height, from average occupant anthropometry can reduce the effectiveness of the seat energy absorbers. In particular, seat energy absorbers that are configured to provide stroke loads corresponding to average occupant anthropometry can either provide excessive stroke load (e.g., too high a force applied to the seat occupant) or an insufficient stroke load (e.g., not enough energy absorption). Further, a variation in an actual crash impact scenario from the specific designed-for crash impact condition may also result in reduced effectiveness of the seat energy absorbers because the known energy absorbers do not account for conditions related to the actual crash impact scenario (e.g., velocity, altitude, attitude, terrain topography, aircraft parameters, etc.).

SUMMARY

An example method includes determining weight of an occupant of a seat of an aircraft, and calculating, using a processor, a stroke load of a seat energy absorber operatively coupled to the seat based on the weight of the occupant. The example method also includes setting the seat energy absorber to the calculated stroke load.

An example apparatus includes a weight sensor on a seat of an aircraft, and a seat energy absorber operatively coupled to the seat. The example apparatus also includes an actuator operatively coupled to the seat energy absorber, and a processor to calculate a stroke load of the seat energy absorber based on occupant weight data from the weight sensor, where the actuator is to adjust the seat energy absorber based on the calculated stroke load.

An example tangible machine readable medium has instructions stored thereon, which when executed, cause a processor of a seat controller of an aircraft seat to receive a weight of an occupant from a weight sensor of the seat, and calculate a stroke load of an energy absorber operatively coupled to the seat based on the received weight.

Figure 1:
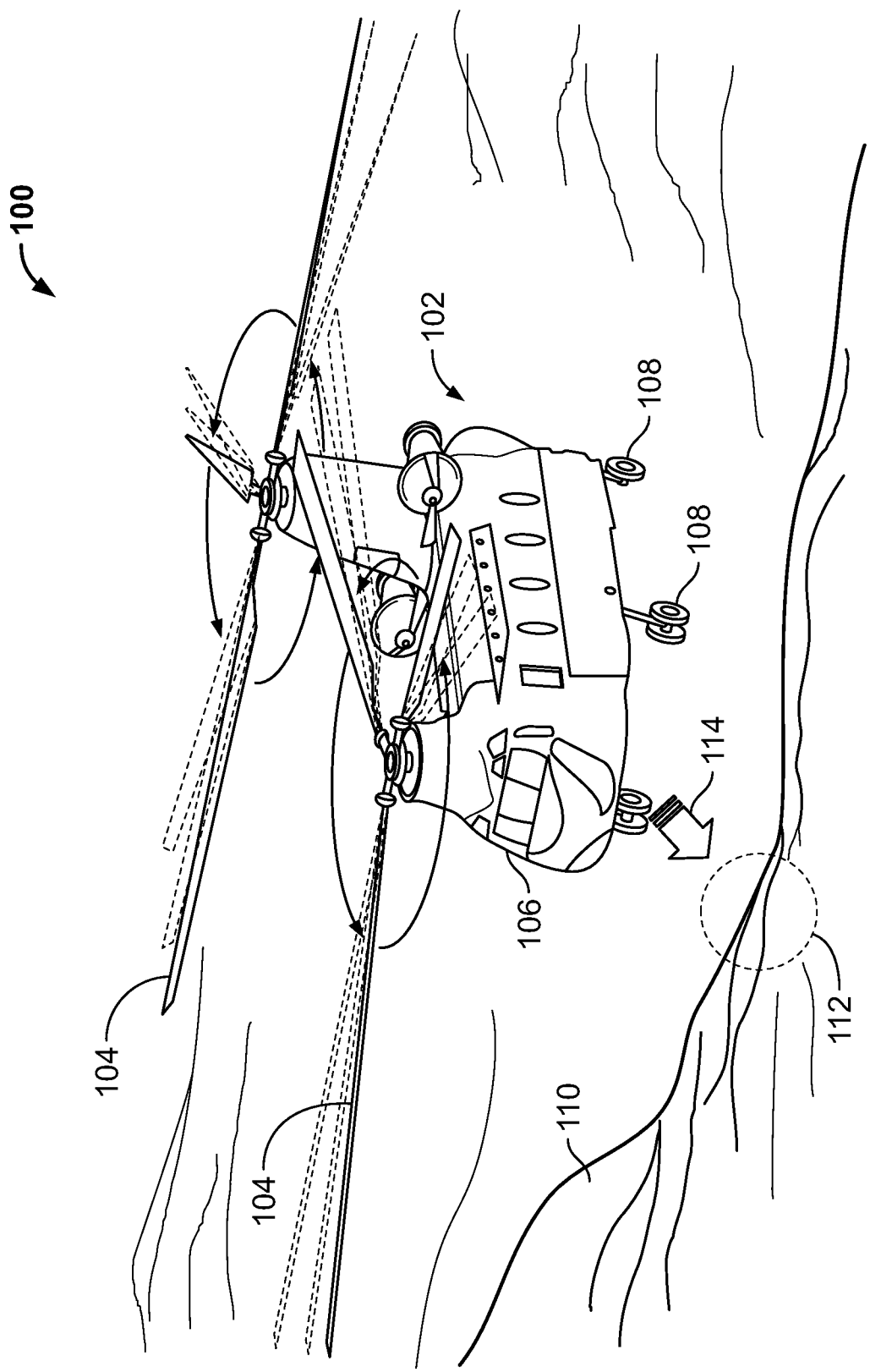
FIG. 1 is an example rotorcraft in which the examples disclosed herein may be implemented.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Actively controlled energy absorption of seats for crash impact is disclosed herein. Some known vehicle seat energy absorbers (e.g., energy absorbers of fixed wing aircraft or rotorcraft, etc.) are configured to provide a stroke (e.g., displace) at a fixed load to reduce the crash forces transmitted to an occupant of a seat during a crash impact. These known seat energy absorbers typically displace at a nominal seat stroke load based on median/average anthropometric data of an average occupant (e.g., the $50^{th}$ percentile), a nominal available seat stroke length and/or a specific designed-for condition (a specific crash impact scenario).

Variations of the anthropometric data amongst individual seat occupants, which can include weight and/or height, relative to anthropometry of the average occupant can reduce the effectiveness of the seat energy absorbers. In particular, excessive or inadequate stroke loads may be applied to the seat occupant. For example, a person who has a weight higher than the average may require a relatively higher stroke load, but be subjected to a lower stroke load than needed. Likewise, a person who has below average weight may be subjected to a higher stroke load than needed, which may result in subjecting this person to higher loads than needed. Further, a variation of an actual crash impact scenario relative to a specific designed-for condition may also result in reduced effectiveness of the seat energy absorbers.

In some known seats with energy absorption devices, a stroke load may be manually adjusted/changed by operators. In particular, an operator and/or flight crew may turn a knob (e.g., an adjustment knob) or handle to adjust the stroke load based on a visual indicator that may provide guidance on a degree to adjust the stroke load based on a person's weight. However, such systems rely on individuals adjusting the stroke load manually and/or remembering to adjust the stroke load based on occupant weight. Further, such indicators do not adjust for an amount of weight that is actually applied to the seat (e.g., an applied weight), which can be a more effective indicator for stroke load adjustment because seat occupants can distribute their weight and the weight of equipment carried by the occupants to a varying degree (e.g., a portion of the occupant's weight may be transferred through the occupant's legs to a floor instead of the seat). Further, these known manually adjustable seat energy absorbers are susceptible to operator adjustment errors, which can also result in significantly reduced effectiveness.

The examples disclosed herein allow individualized control of stroke load and/or stroke displacement of vehicle seat energy absorbers based on anthropometric data (e.g., weight, height, etc.) of a seat occupant in an aircraft to more effectively reduce forces encountered by the occupant during a crash impact of the aircraft. The examples disclosed herein automatically gather the anthropometric data of seat occupants and, thus, eliminate reliance on a person's memory and/or the person being prompted (e.g., by a pre-flight checklist) by visual cues to adjust the stroke load. The anthropometric data may include occupant height, which may be based on available stroke resulting from an adjusted seat position and/or occupant weight applied to the seat (e.g., an effective weight or a portion of the weight of the occupant that is transferred to the seat).

The examples disclosed herein utilize a seat that automatically measures a weight of a seat occupant (e.g., a weight applied to the seat by the occupant) to adjust a stroke load of a seat energy absorber. In some examples, the weight is measured while an aircraft is on the ground and/or stationary (e.g., prior to takeoff). In some examples, a stroke position of the seat and/or an available stroke (e.g., available vertical displacement) of the seat is taken into account in determining the stroke load. Additionally or alternatively, some examples disclosed herein utilize impact conditions (e.g., predicted impact conditions) to adjust and/or re-adjust the stroke load (e.g., re-adjust the stroke load after it has been set/adjusted based on occupant weight and/or height).

As used herein, the term "seat" can refer to a seat, a seat bucket or a seat assembly. For example, the term "seat" may refer to a movable portion of a seat or an entire seat assembly.

FIG. 1 is a rotorcraft 100 in which the examples disclosed herein may be implemented. The rotorcraft 100 of the illustrated example includes a fuselage 102, rotors 104, a cockpit 106 of the fuselage 102 and landing gear 108. In the view of FIG. 1, the rotorcraft 100 is about to impact terrain 110. In particular, the rotorcraft 100 is about to strike an impact zone 112 while moving in a direction generally indicated by an arrow 114, which represents an impact vector of the rotorcraft 100. As a result, occupants within the cockpit 106 can be subjected to impact forces and/or accelerations/decelerations that may translate through seats on which the occupants are sitting. Many known energy absorption systems for such seats are configured to provide a stroke load and/or displacement that is based on median or average occupant biometrics, default seat displacement/stroke and/or default impact conditions.

Figure 2:
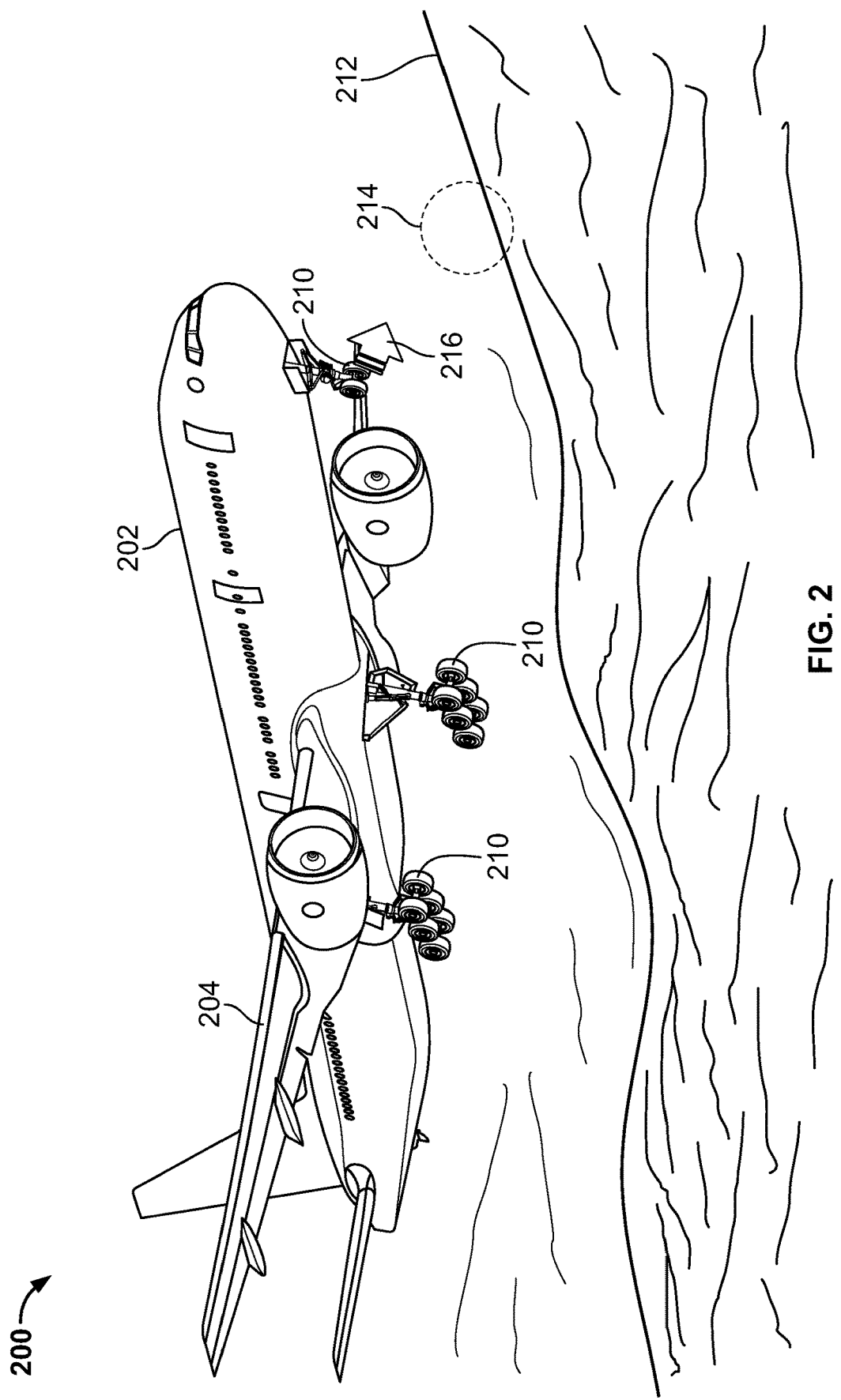
FIG. 2 is an example fixed wing aircraft in which the examples disclosed herein may be implemented.

FIG. 2 is a fixed wing aircraft 200 in which the examples disclosed herein may be implemented. The example aircraft 200 includes a fuselage 202, wings 204 and landing gear 210. In this example, the landing gear 210 is in a deployed position. In the view of FIG. 2, the example aircraft 200 is about to impact/collide with terrain 212 (e.g., during an emergency landing). In particular, the aircraft 200 is about to strike an impact zone 214 while moving in a direction generally indicated by an arrow 216. As a result, occupants (e.g., flight crew, passengers, etc.) of the aircraft 200 can be subjected to impact forces and/or accelerations/decelerations that may translate through seats of the occupants during the impact.

Figure 3A:
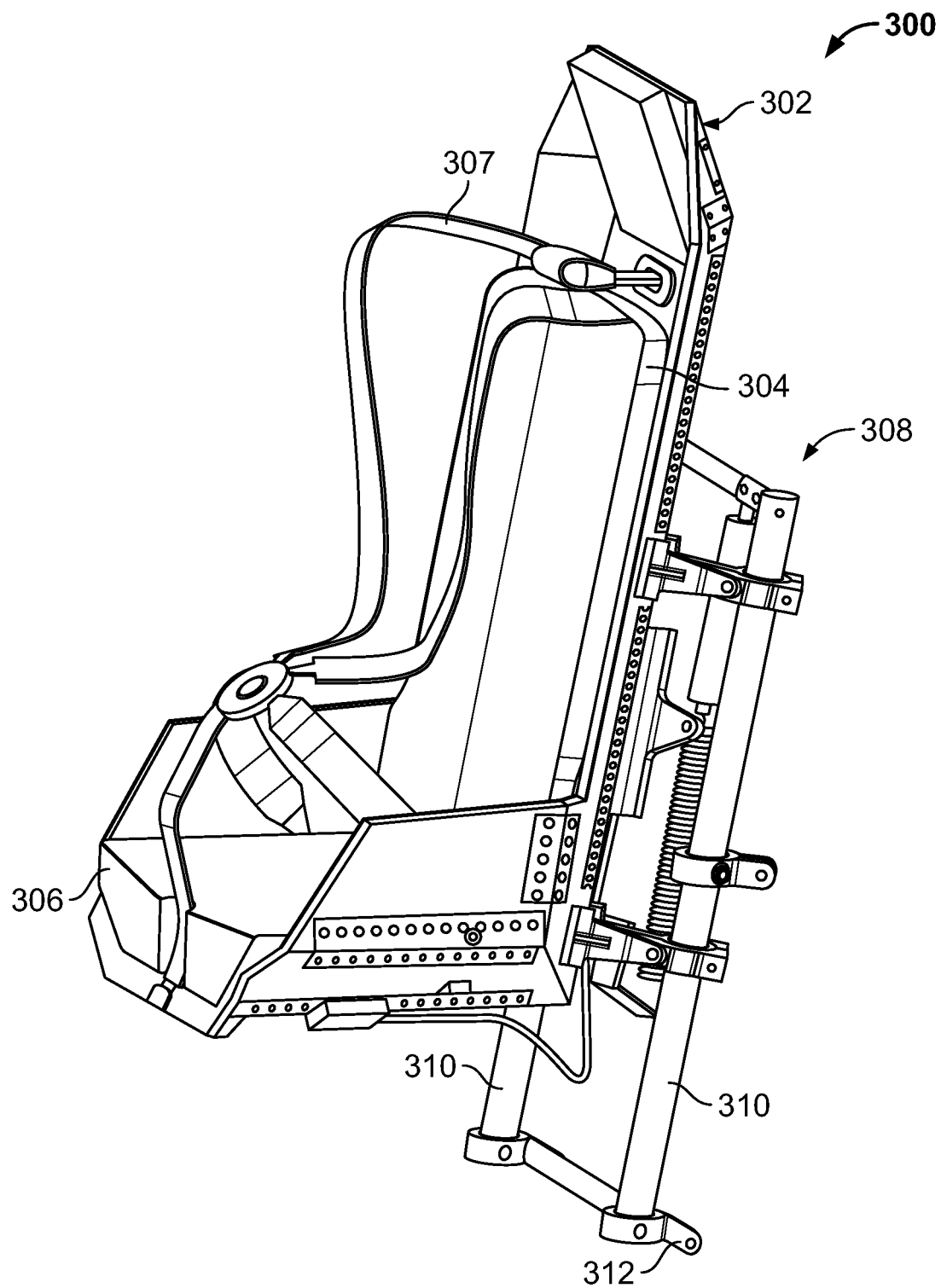
FIG. 3A is an example seat in accordance with the teachings of this disclosure.

FIG. 3A is an example seat (e.g., a seat assembly, a mounted seat, etc.) 300 in accordance with the teachings of this disclosure. The seat 300 of the illustrated example includes a seat bucket (e.g., occupant seat frame, a movable seat, etc.) 302, an upper occupant support 304, a lower occupant support 306 and a safety harness 307, which is coupled to the bucket 302. In this example, the seat bucket 302 is operatively coupled to a mounting frame 308, which includes mounting rails 310 and a floor mount/support 312.

The seat 300 of the illustrated example is used to secure an occupant of a vehicle (e.g., an aircraft, a land vehicle, a submersible vehicle, etc.). The upper occupant support 304 and the lower occupant support 306 of the illustrated example support the weight of and/or secure the occupant. As will be described in greater detail below in connection with FIG. 3B, the bucket 302 moves relative to the mounting frame 308 to absorb energy (e.g., impact energy) and/or to enable occupant seat height adjustments.

Figure 3B:
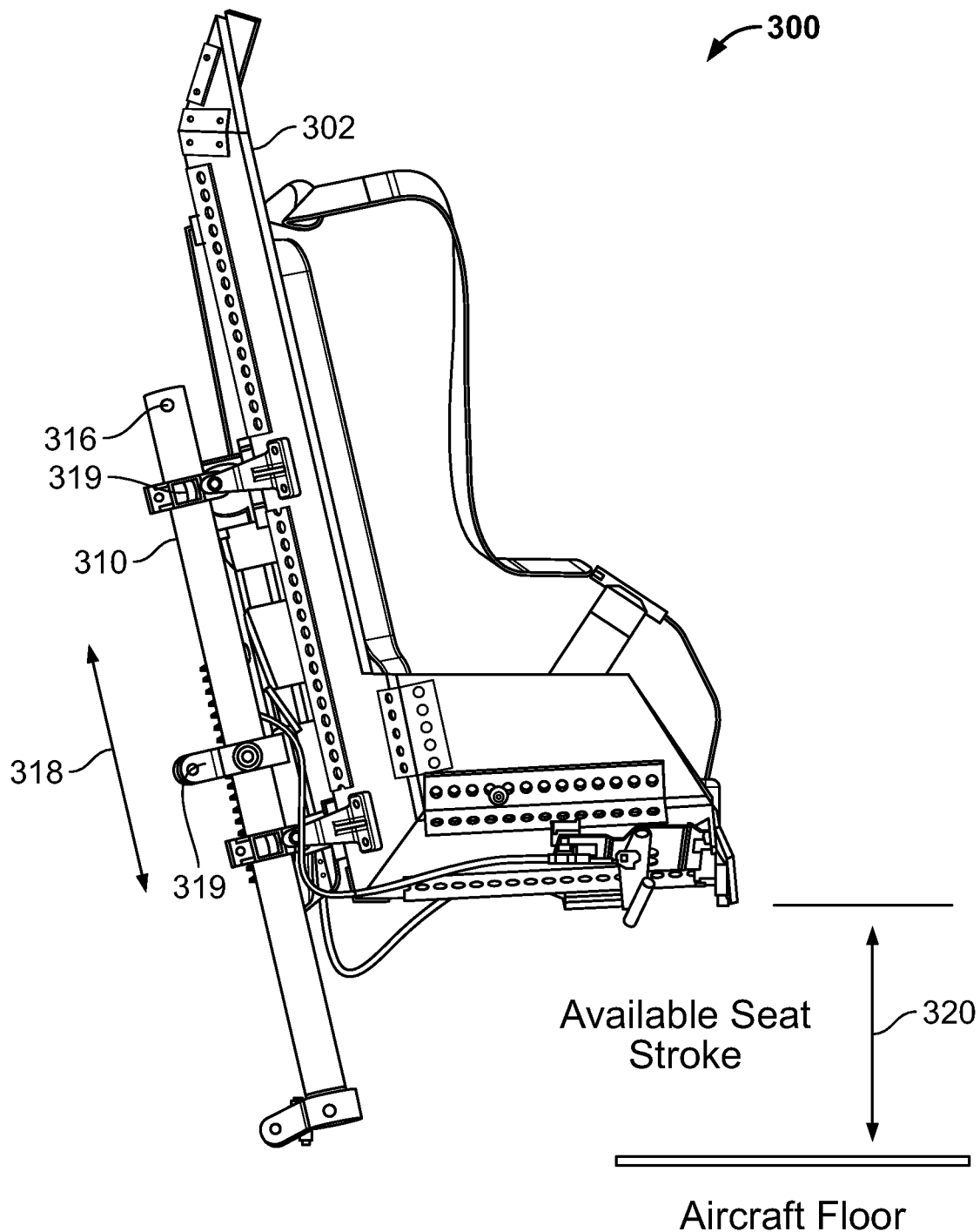
FIG. 3B is a side view of the example seat of FIG. 3A.

FIG. 3B is a side view of the example seat 300 of FIG. 3A. In the illustrated example of FIG. 3B, the mounting rails 310 include mounting apertures 316 and the bucket 302 moves along and/or is guided along (e.g., slides along, slides in a direction of) the mounting rails 310 in directions (e.g., generally vertical directions) indicated by a double arrow 318. In this example, collars 319 engage and slide on the cylindrical surfaces of the stationary mounting rails 310 while the seat bucket 302 and the collars 319 displace relative to the mounting rails 310, for example. The displacement of the bucket 302 relative to a floor is generally referred to as a stroke and is depicted by a double arrow 320. In particular, the stroke defines an amount of displacement possible for the bucket 302 while energy (e.g., kinetic energy associated with an impact) of the seat 300 is reduced and/or eliminated by an energy absorption mechanism/hardware that affects movement of the bucket 320 within at least a portion of the stroke of the seat 300. The available seat stroke is also at least partially defined by height requirements of a seat occupant (e.g., based on a height from the seat occupant's knees to their feet and desired eye position).

Figure 4:
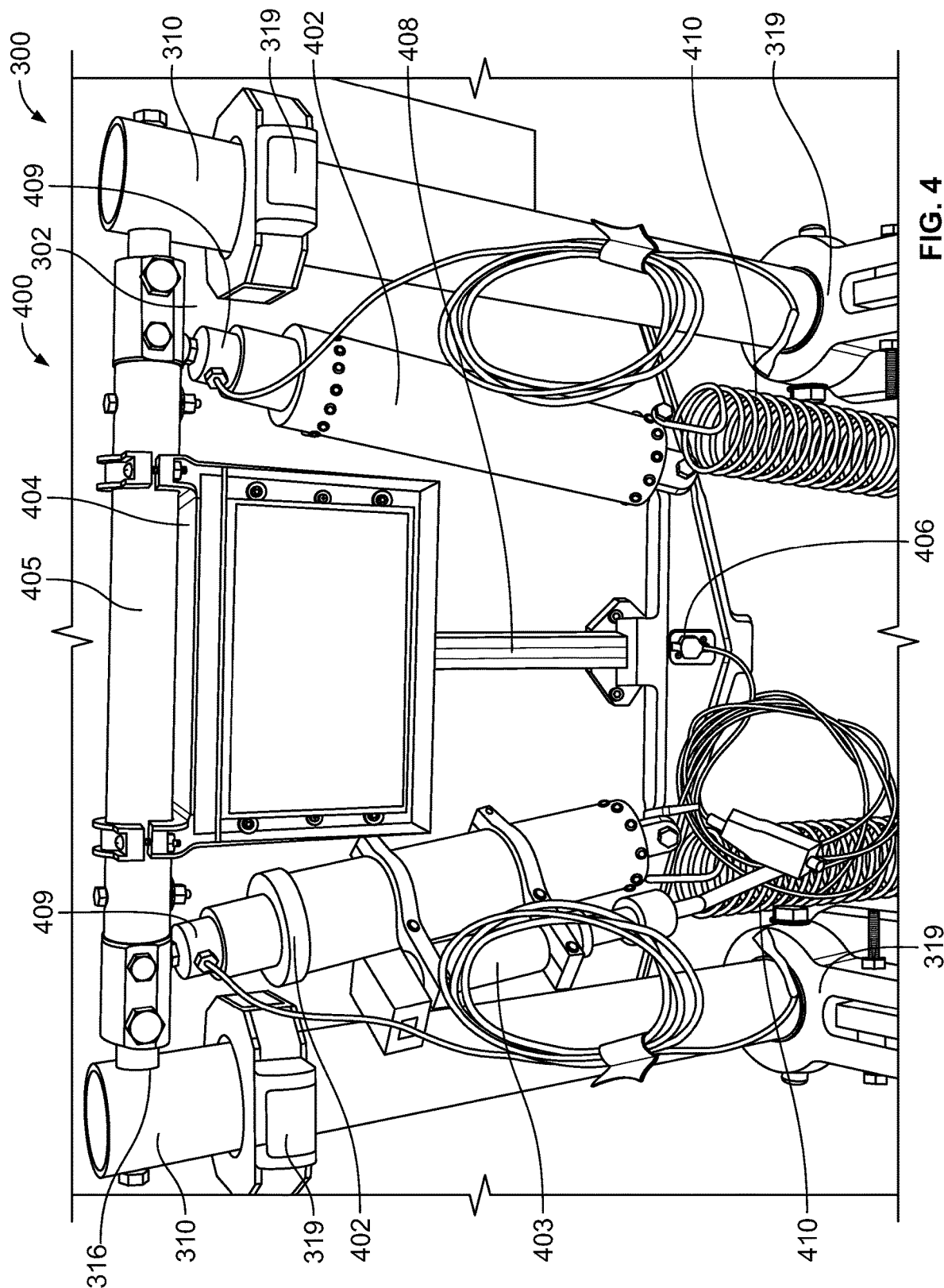
FIG. 4 is an example stroke load adjustment system of the example seat of FIGS. 3A and 3B.

FIG. 4 is an example stroke load adjustment system 400 that may be implemented in the example seat 300 of FIGS. 3A and 3B. In the illustrated view of FIG. 4, the stroke load adjustment system 400 is shown assembled as part of the example seat 300. The example stroke load adjustment system 400 includes energy absorbers 402, actuators/motor assemblies 403 (one removed for clarity in this view), a servomotor controller 404, which is affixed to a crossbeam 405 that is mounted to the mounting apertures 316 described above in connection with FIG. 3B. The example stroke load adjustment system 400 also includes an optical position sensor (e.g., an optical sensor, a positional sensor, etc.) 406, an optical position strip 408, load cells 409 and seat adjustment assist springs 410, which are used for vertical adjustment of the bucket 302 (e.g., to facilitate movement of the bucket 302 by crew members). The energy absorbers 402 are coupled, at a first end, to the crossbeam 405 and operatively coupled, at a second end, to the bucket 302 (e.g., displaces with the bucket 302 at the second end). In this example, the energy absorbers 402 are inversion tube type energy absorbers. However, the energy absorbers 402 may be any appropriate type of energy absorption device including, but not limited to, non-linear springs, dampeners, electromagnetic devices, etc.

The servomotor controller 404 of the illustrated example is communicatively coupled to the motor assemblies (e.g., rotational servomotors) 403, which are used to adjust the energy absorbers 402, thereby varying a load (e.g., a stroke load) provided to an occupant of the seat 300. Additionally or alternatively, the energy absorbers 402 may be adjusted to vary a dampening effect of the seat occupant in response to forces and/or accelerations. In this example, the load cells 409, which are coupled to the energy absorbers 402 and communicatively coupled to the servomotor controller 404, provide a weight and/or applied weight of the seat occupant to the servomotor controller 404 which, in turn, causes the motor assemblies 403 to vary the stroke load of the energy absorbers 402 based on the weight and/or the applied weight of the seat occupant.

In this example, the optical position sensor 406 is also communicatively coupled to the servomotor controller 404. In this example, the optical position sensor 406 provides a stroke and/or available stroke to the servomotor controller 404. Operation of the optical sensor 406 is described in greater detail below in connection with FIG. 8.

In this example, the servomotor controller 404 causes each of the motor assemblies 403 to rotate and/or displace a cable 700, which is shown below in connection with FIG. 7, to activate load control mechanisms within the energy absorbers 402, thereby changing stroke loads of the respective energy absorbers 402. In particular, the rotation of the cable 700 causes a spherical roller mechanism of the energy absorber 402 to displace against a contour or cam surface, thereby altering the stroking load of the energy absorber 402. In this example, each motor assembly of the motor assemblies 403 controls a respective energy absorber 402 on an opposite side (e.g., a left motor assembly controls a right energy absorber in the view of FIG. 4).

In some examples, the servomotor controller 404 is communicatively coupled to vehicle management systems (e.g., cockpit systems, flight instrumentation, sensors, etc.) of an aircraft. In such examples, the vehicle management systems may provide anticipated/expected impact/collision data (e.g., impact conditions, predicted impact conditions, etc.) to the servomotor controller 404. In turn, the example motor controller 404 may adjust the stroke load of the energy absorbers 402 at least partially based on this information. The data provided from the vehicle management systems may include, but is not limited to, terrain topography, velocity of the aircraft, acceleration of the aircraft, altitude of the aircraft, weight of the aircraft (e.g., accounting for fuel burn, etc.) and/or predicted impact characteristics, etc. Examples of data correlations used to account for impacts (e.g., impending impacts, predicted impacts) are described below in connection with FIGS. 13 and 14.

Figure 5:
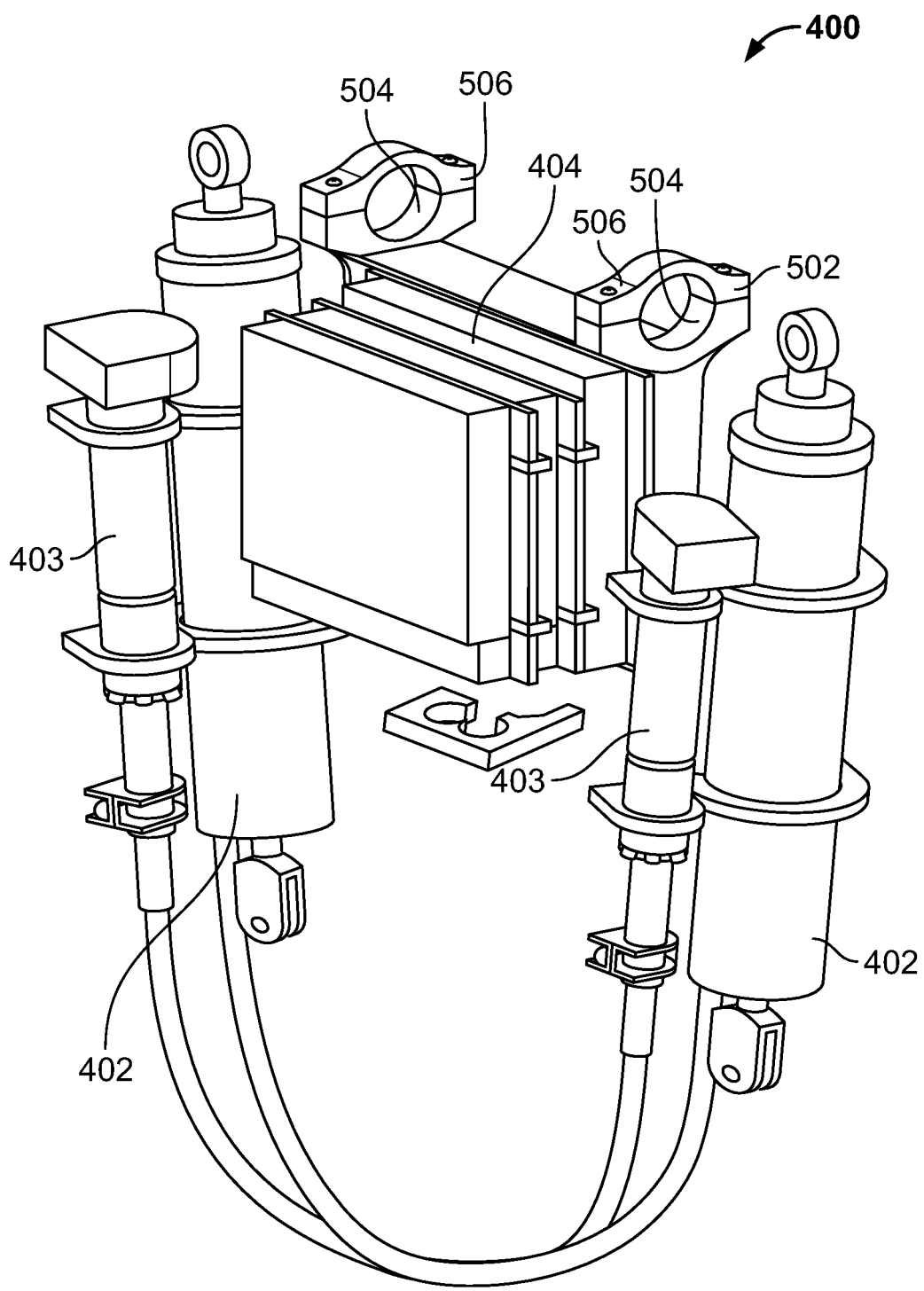
FIG. 5 is another view of the example stroke load adjustment system of FIG. 4.

FIG. 5 is another view of the example stroke load adjustment system 400 of FIG. 4. In the view of FIG. 5, the energy absorbers 402, the motor assemblies 403 and the servomotor controller 404 are shown removed from the seat 300. In this example, the servomotor controller 404 is coupled and/or assembled to a mounting bracket 502, which has apertures 504 to receive the crossbeam 405 for coupling the bracket 502 along with the servomotor controller 404 to the crossbeam 405. As described above in connection with FIG. 4, the crossbeam 405 remains fixed to the mounting rails 310. In this example, the mounting bracket 502 includes removable caps or clips 506 to facilitate assembly of the mounting bracket 502 along with the servomotor controller 404 to the crossbeam 405.

Figure 6:
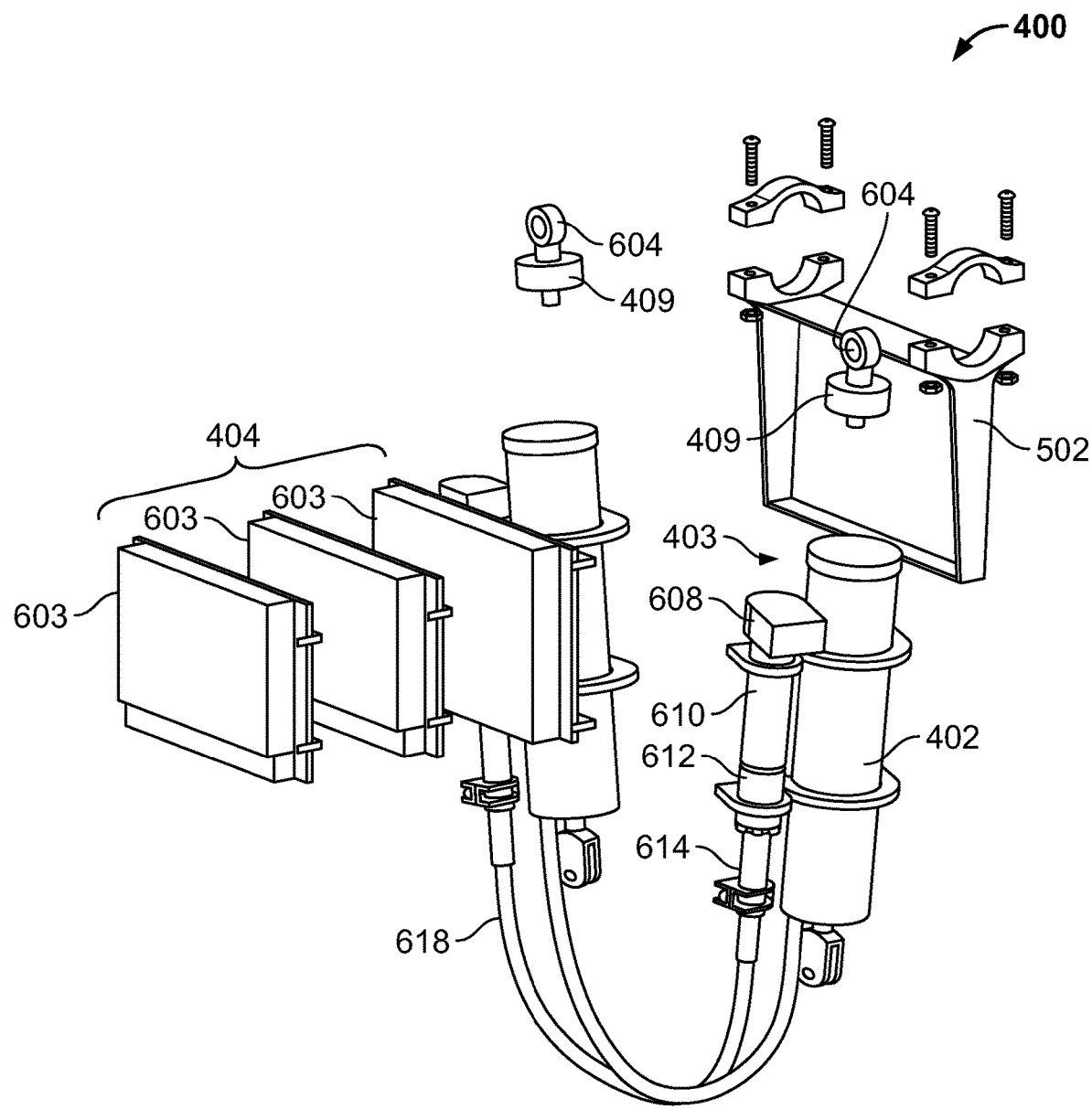
FIG. 6 is an exploded assembly view of the example stroke load adjustment system of FIGS. 4-5.

FIG. 6 is an exploded assembly view of the example stroke load adjustment system 400 of FIGS. 4-5. In the illustrated example of FIG. 6, the servomotor controller 404 is shown removed from the mounting bracket 502 and separated into discrete circuit boards 603. In this example, rod ends (e.g., mounts) 604 and the load cells 409 are shown separated from the respective energy absorbers 402. The rod ends 604 of the illustrated example are to be mounted to the crossbeam 405.

In this example, one of the motor assemblies 403 includes an encoder 608, a motor 610, a gearbox or transmission 612 and a coupler 614. As mentioned above in connection with FIG. 4, the motor assembly 403 controls/varies a stroke load (e.g., an applied load) of the respective energy absorber 402 (e.g., the respective energy absorber 402 on the opposite side) via cable assemblies 618. In this example, cables 700 (shown in FIG. 7) of the cable assemblies 618 are rotated, thereby activating/varying the load control mechanisms within the energy absorbers 402 to vary/adjust an applied stroke load of the respective energy absorbers 402 coupled to each of the respective cables 700.

The example transmission 612 transfers a rotational motion from the motor 610 to a rotational motion of one of the cables 700. This rotational motion of the cable 700 causes a displacement within the respective energy absorber 402 that activates the load control mechanisms within the respective energy absorber 402, thereby altering a force/displacement relationship of the bucket 302 relative to stationary portions of the example seat 300 (e.g., the crossbeam 405 and the mounting rails 310). The encoder 608 of the illustrated example measures rotations and/or rotational displacement of the motor 610 and provides the rotational information of the motor 610 to the servomotor controller 404 so that the servomotor controller 404 can determine the current stroke load of the respective energy absorber 402.

Figure 7:
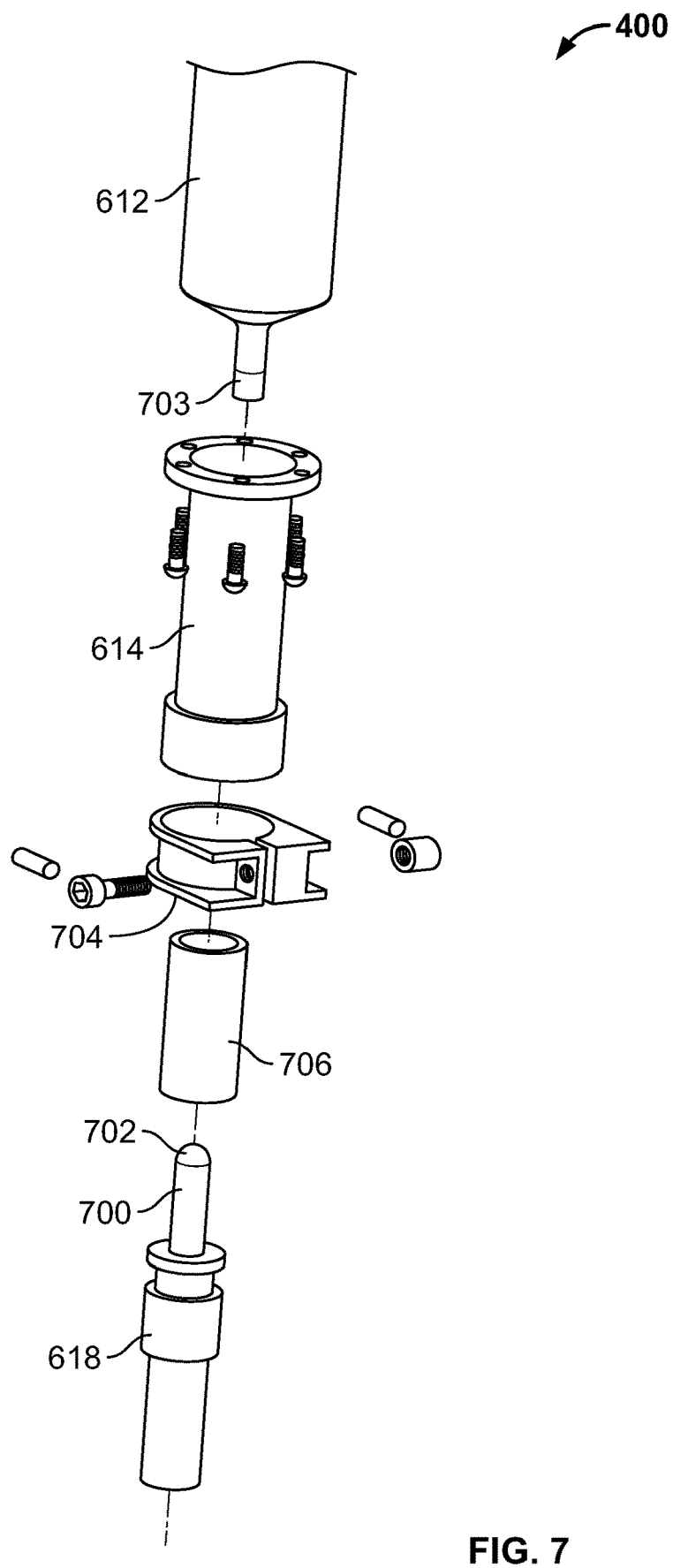
FIG. 7 is an exploded assembly view of a portion of the housing assembly of the example stroke load adjustment system of FIGS. 4-6.

FIG. 7 is an exploded assembly view of a portion of the example stroke load adjustment system 400 of FIGS. 4-6. In the view of FIG. 7, the housing 614 and the cable assembly 618 are shown separated/disassembled from the transmission 612, thereby exposing a first attachment point 702, which is at an end of the aforementioned rotating cable (e.g., a rotational actuation cable) 700, and an attachment point 703 of the transmission 612 within the housing 614. In this example, the attachment point 702 and the attachment point 703 are to be coupled together. A coupler 704 of the illustrated example couples the housing 614 to a tube 706, which may act as an alignment device for the translating/rotating cable 700.

In operation, a rotational movement of the motor 610 is translated through the transmission 612, thereby causing the cable 700 to rotate along with the attachment points 702 and 703. The rotation of the cable 700 causes a displacement within the respective energy absorber 402 that causes the load control mechanism within the energy absorber 402 to adjust a stroke load of the respective energy absorber 402.

While the rotational actuation cable 700 is described in the examples disclosed herein, any appropriate actuation system, electro-magnetic actuation system and/or dampening adjustment system may be used such as, but not limited to, a linear displacement actuation system, an adjustable fluid damping system, an adjustable spring, an active suspension system, an adjustable magnetic-resistance system, or any other appropriate energy (e.g., mechanical energy, kinetic energy, etc.) dissipation system.

Figure 8:
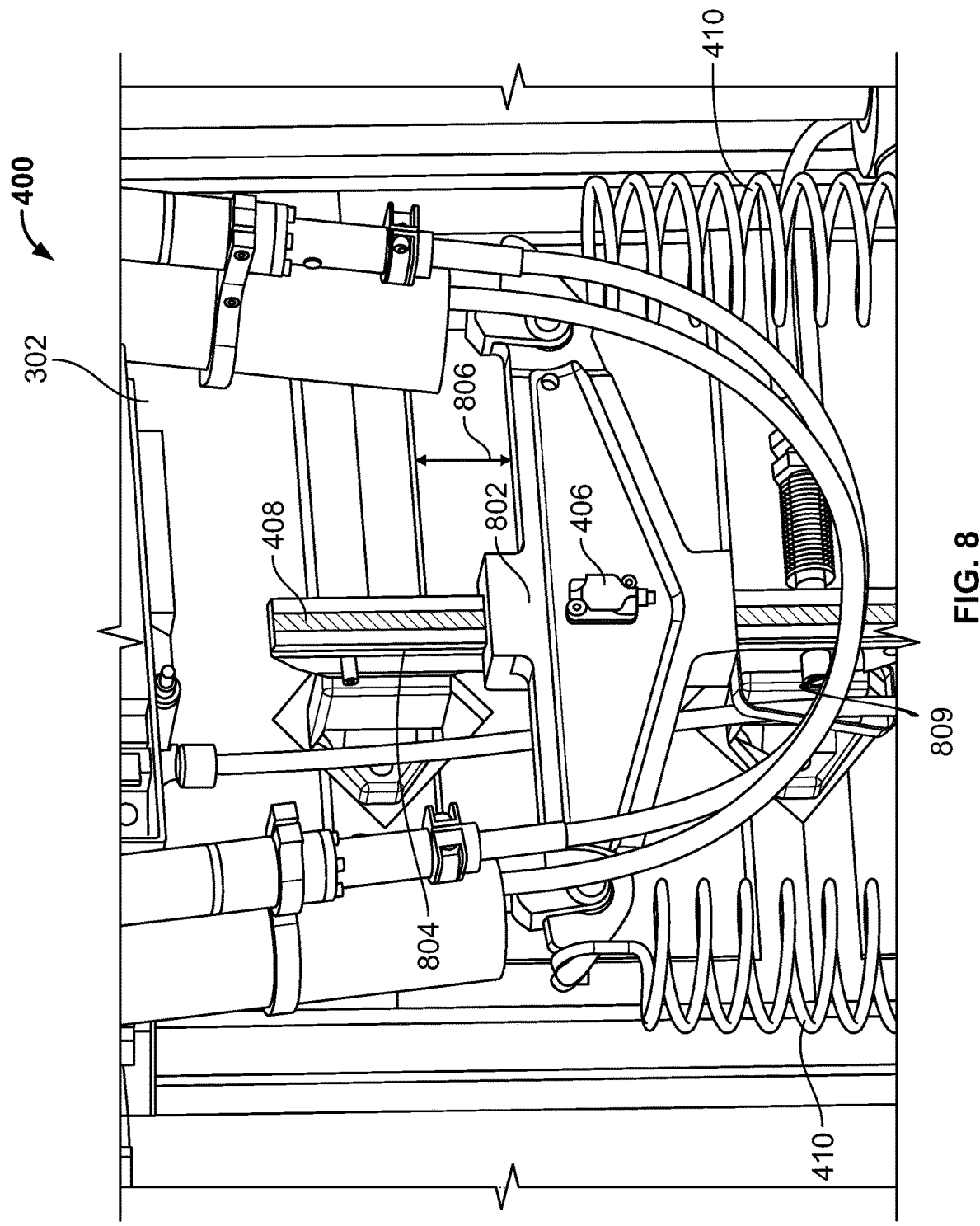
FIG. 8 is yet another view of the example stroke load adjustment system of FIGS. 4-7.

FIG. 8 is yet another view of the example stroke load adjustment system 400 of FIGS. 4-7. In the illustrated example of FIG. 8, a support bracket 802, which moves along with the bucket 302, is shown movably coupled (e.g., a coupling that defines a linear displacement) to an optical strip rack 804. During the vertical adjustment of the seat bucket 302 by the occupants to accommodate different occupant anthropometry, a pin 809, which couples and/or engages the optical strip rack 804 to the support bracket 802, is disengaged. As a result, the optical strip rack 804 moves vertically along with the seat bucket 302 relative to the support bracket 802. The example support bracket 802 has the position sensor 406 mounted/coupled thereto. Likewise, the optical position strip 408 is coupled to the optical strip rack 804. In this example, the seat adjustment assist springs 410 are coupled to the support bracket 802.

In operation, vertical adjustment (vertical movement in the view of FIG. 8) of the seat bucket 302 as generally indicated by a double arrow 806 causes the support bracket 802 and the position sensor 406 to move relative to the optical strip rack 804 and the optical position strip 408. As the support bracket 802 displaces, the position sensor 406 of the illustrated example measures a relative position of the optical position strip 408, thereby determining an available stroke of the bucket 302 (e.g., after an adjustment of an occupant.). In particular, the optical position sensor 406 of the illustrated example determines a relative displacement of the optical position sensor 406 from the optical position strip 408 by identifying and/or counting portions (e.g., ticks) of the optical position strip 408, via an encoder (e.g., a visual encoder) of the optical position sensor 406 as the bucket 302 moves up and down relative to the optical position strip 408. In this example, the servomotor controller 404 uses this determined/measured stroke to calculate a stroke and/or available stroke of the bucket 302. In some examples, the optical position sensor 406 is used to determine a height of the seat occupant. The stroke and/or available stroke of the bucket 302 can also be used to calculate and/or re-adjust the aforementioned stroke load. While a linear optical measurement system is shown in the illustrated example of FIG. 8, any other appropriate positional detection system may be used.

Figure 9:
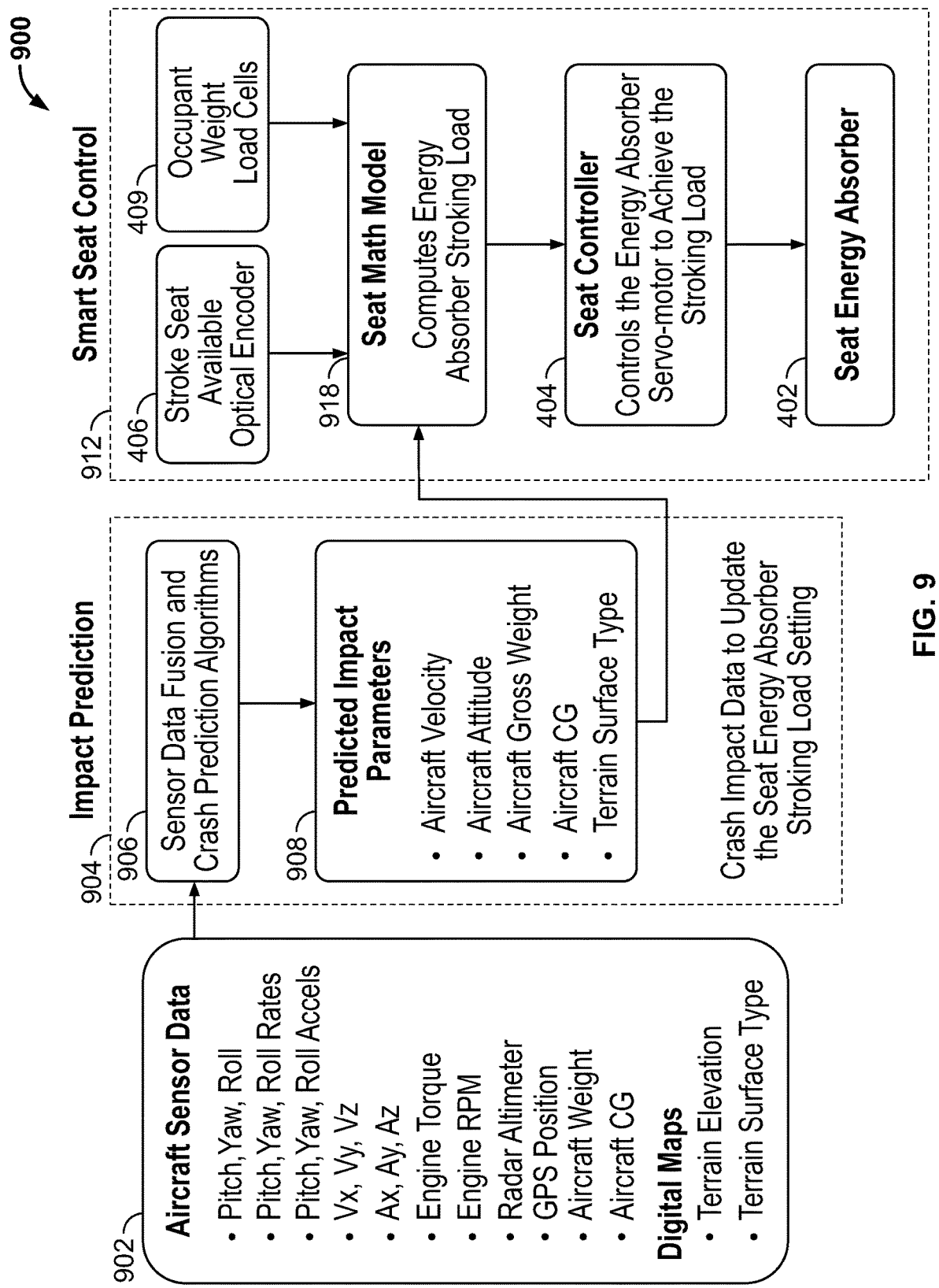
FIG. 9 is a schematic overview of an example architecture of an example implementation of the stroke load adjustment system of FIGS. 4-7.

FIG. 9 is a schematic overview of an example architecture 900 of one example implementation of the stroke load adjustment system 400 of FIGS. 4-7. The example algorithm 900 includes input data 902, which may be provided from sensor/sensor systems and/or flight control systems, an impact prediction engine 904, which includes sensor data fusion and crash prediction algorithms 906 and predicted impact parameters (e.g., predicted impact conditions) 908, and a smart seat control 912. The smart seat control 912 of the illustrated example includes the position sensor 406, the occupant weight load cell 409, a seat math model 918, the servomotor controller 404 and the seat energy absorber 402.

In operation, the input data 902 of the illustrated example is provided to the impact prediction engine 904 (e.g., the sensor data fusion and crash prediction algorithms 906 of the impact prediction engine 904). The input data 902 may include, but is not limited to, pitch (position, rates, acceleration), yaw (position, rates, acceleration), roll (position, rates, acceleration), velocity, velocity vector components, acceleration, acceleration vector components, engine torque, engine rotations per minute (RPM), radar altimeter, global positioning system (GPS) position, aircraft weight and/or aircraft center of gravity, etc. Additionally or alternatively, in some examples, the input data 902 also includes digital map data that includes terrain elevation (e.g., elevation related to current altitude, etc.) and/or terrain surface type/topography.

The example impact prediction engine 904 predicts the impact parameters 908 based on the input data 902. The predicted impact parameters 908 may include aircraft velocity (e.g., aircraft velocity at impact), aircraft attitude (e.g., aircraft attitude at impact), aircraft gross weight (e.g., aircraft weight after fuel burn, etc.), aircraft center of gravity and terrain surface type/topography. In this example, the impact prediction engine 904 calculates the predicted impact parameters based on the input data 902. Additionally or alternatively, the impact prediction engine 904 calculates and/or re-calculates stroke load of the energy absorber 402 based on the predicted impact parameters 908 to be provided to the smart seat control 912.

In this example, the smart seat control 912 receives the predicted impact parameters from the impact prediction engine 904. In particular, the seat math model 918 receives the predicted impact parameters 908 as well as available stroke information (e.g., seat bucket displacement based on anthropometric data) from the optical encoder 406 and occupant weight from the load cell 409. As a result, the seat math model 918 then calculates a stroke load that is provided to the servomotor controller 404 which, in turn, controls the seat energy absorber 402 to the calculated stroke load. Example calculations/math models are described below in connection with FIGS. 13 and 14 below.

Figure 10:
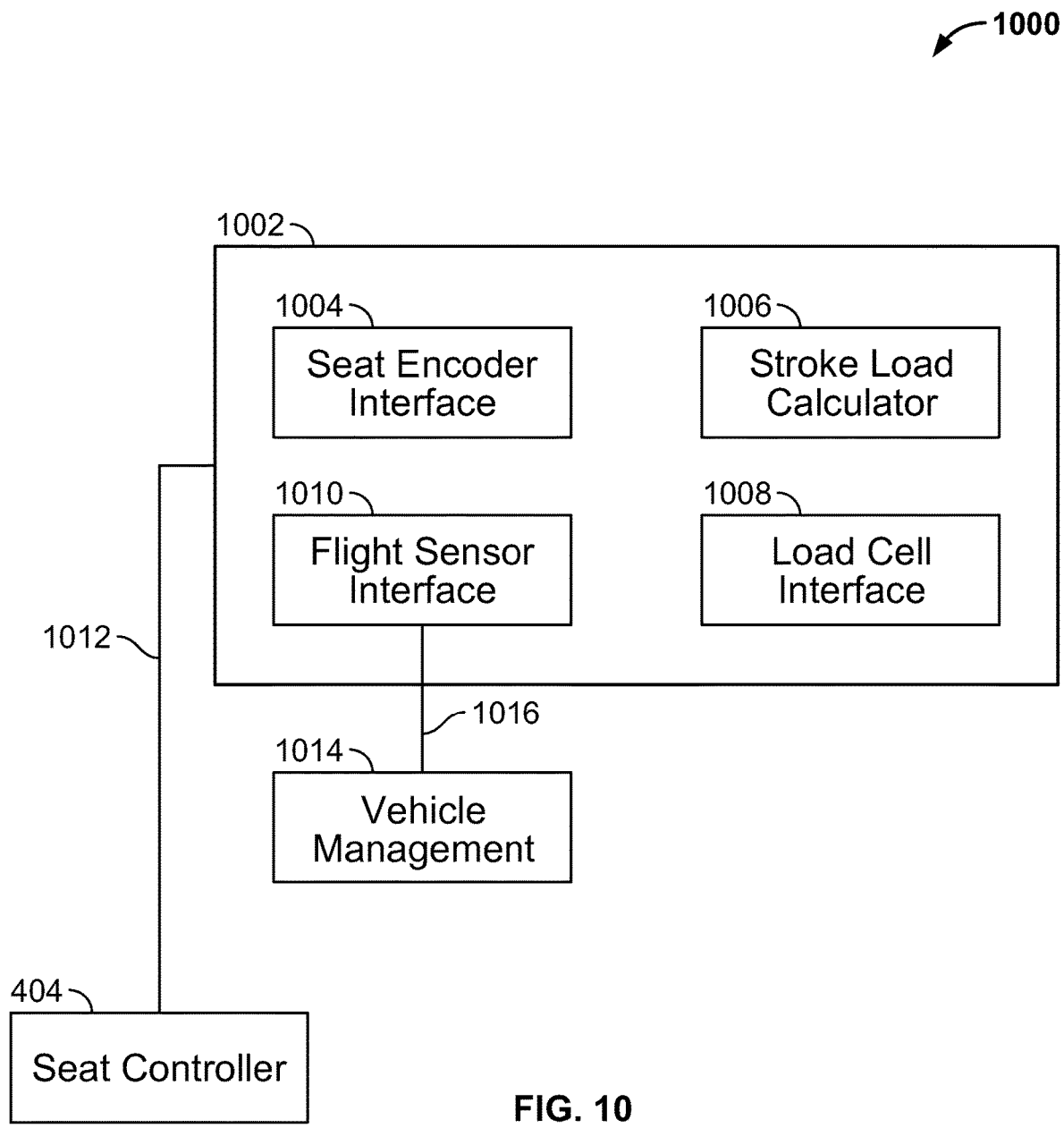
FIG. 10 is an example seat control system that may be used to implement the examples disclosed herein.

FIG. 10 is an example seat control system 1000 that may be used to implement the example architecture 900 of FIG. 9. The example seat control system 1000 includes a calculation module 1002, which includes a seat displacement encoder interface 1004, a stroke load calculator 1006, a load cell interface 1008, and a flight sensor interface (e.g., a flight control system interface, etc.) 1010. The calculation module 1002 of the illustrated example is communicatively coupled to the servomotor controller 404 via a communication line 1012. Similarly, in this example, the flight sensor interface 1010 is coupled to vehicle management (e.g., sensor communication systems, flight instrumentation, etc.) 1014 via a communication line 1016.

In this example, the load cell interface 1008 receives/determines an occupant weight via a load cell such as the load cell 409, for example. As a result, the example stroke load calculator 1006 calculates a stroke load of an energy absorber such as the energy absorber 402, for example, based on the occupant weight. In some examples, the calculation of the stroke load is further based on a seat position (e.g., a relative seat position), stroke and/or available stroke provided by the seat encoder interface 1004. Additionally or alternatively, the stroke load is calculated based on predicted impact conditions such as those described above in connection with FIG. 9.

In some other examples, the servomotor controller 404 calculates the stroke load instead of the calculation module 1002, based on one or more of occupant weight from the load cell interface 1008, available seat stroke from the seat encoder interface 1004 and/or flight data (e.g., predicted impact data, flight parameters, etc.) received via the flight sensor interface 1010.

While an example manner of implementing the example seat control system 1000 is illustrated in FIG. 10, one or more of the elements, processes and/or devices illustrated in FIG. 10 may be combined, divided, re-arranged, omitted, eliminated and/or implemented in any other way. Further, the example calculation module 1002, the example seat encoder interface 1004, the example stroke load calculator 1006, the example load cell interface 1008, the example flight sensor interface 1010, the example servomotor controller 404, the example vehicle management 1014 and/or, more generally, the example seat control system 1000 of FIG. 10 may be implemented by hardware, software, firmware and/or any combination of hardware, software and/or firmware. Thus, for example, any of the example calculation module 1002, the example seat encoder interface 1004, the example stroke load calculator 1006, the example load cell interface 1008, the example flight sensor interface 1010, the example servomotor controller 404, the example vehicle management 1014 and/or, more generally, the example seat control system 1000 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, calculation module 1002, the example seat encoder interface 1004, the example stroke load calculator 1006, the example load cell interface 1008, the example flight sensor interface 1010, the example servomotor controller 404, and/or the example vehicle management 1014 is/are hereby expressly defined to include a tangible computer readable storage device or storage disk such as a memory, a digital versatile disk (DVD), a compact disk (CD), a Blu-ray disk, etc. storing the software and/or firmware. Further still, the example seat control system 1000 of FIG. 10 may include one or more elements, processes and/or devices in addition to, or instead of, those illustrated in FIG. 11, and/or may include more than one of any or all of the illustrated elements, processes and devices.

Figure 11:
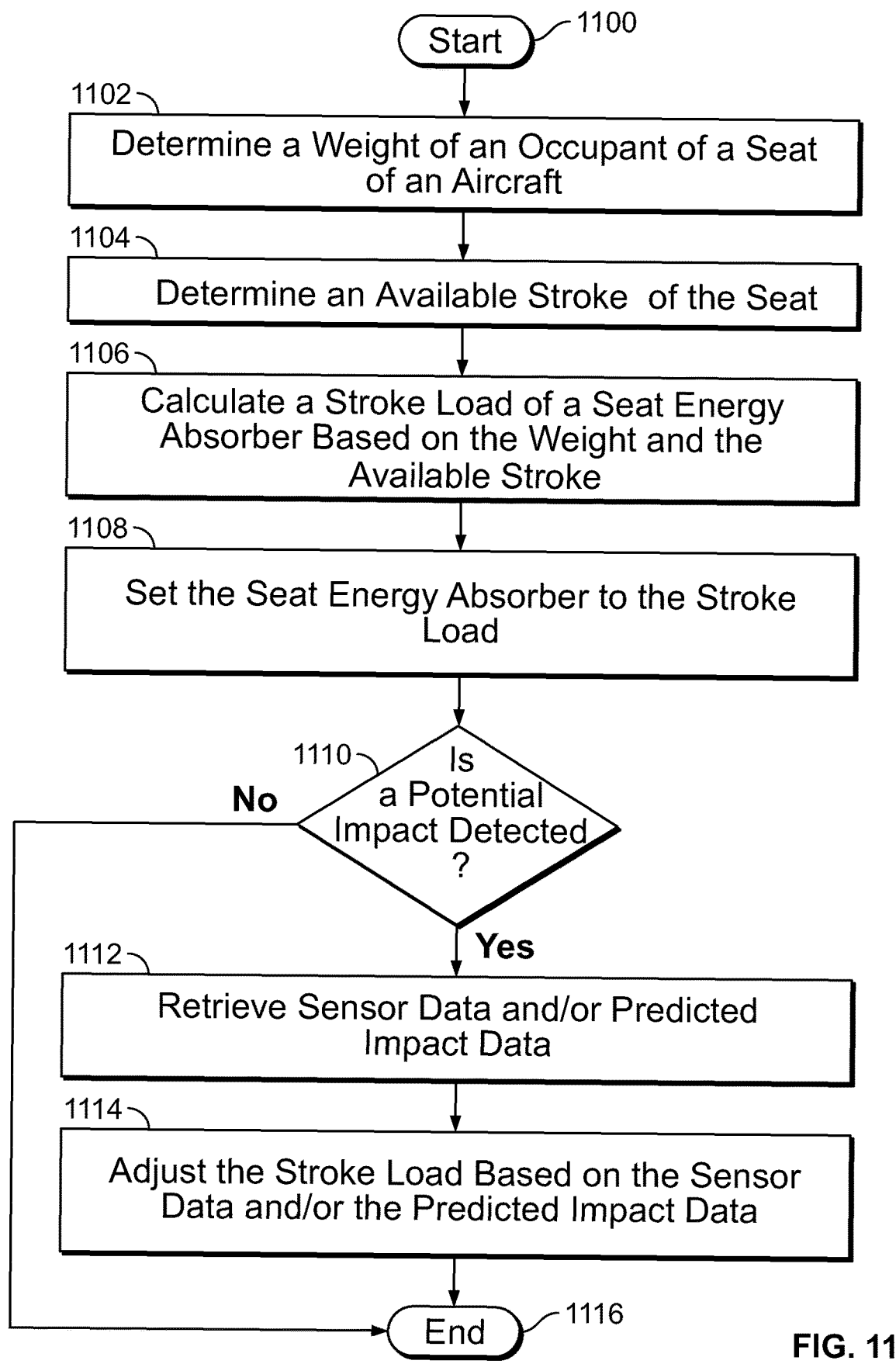
FIG. 11 is a flowchart representative of an example method that may be used to implement the examples disclosed herein.

A flowchart representative of example method for implementing the seat control system 1000 of FIG. 10 is shown in FIG. 11. In this example, the method may be implemented using machine readable instructions that comprise a program for execution by a processor such as the processor 1212 shown in the example processor platform 1200 discussed below in connection with FIG. 12. The program may be embodied in software stored on a tangible computer readable storage medium such as a CD-ROM, a floppy disk, a hard drive, a digital versatile disk (DVD), a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowchart illustrated in FIG. 11, many other methods of implementing the example seat control system 1000 may alternatively be used. For example, the order of execution of the blocks may be changed, and/or some of the blocks described may be changed, eliminated, or combined.

As mentioned above, the example method of FIG. 11 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example method of FIG. 11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example method of FIG. 11 begins at block 1100 where an aircraft is on the ground prior to takeoff (block 1100). A weight of an occupant of a seat (e.g., the seat 300) of the aircraft is determined (block 1102). For example, a load cell such as the load cell 409 determines the weight before the aircraft is on the ground. In some examples, the weight measured by the load cell is not the occupant's entire weight, but a portion of the occupant's entire weight that is translated through the seat (e.g., an effective weight).

In some examples, an available stroke of the seat is then determined (block 1104). For example, the available seat stroke is determined from a position sensor (e.g., encoder) such as the optical position sensor 406. In some examples, a height of the occupant may be determined based on the relative position of a bucket (e.g., the bucket 302) to the seat. In some examples, this position is measured by the load cell while the aircraft is on the ground. Additionally or alternatively, the stroke position is measured after the position has been changed/adjusted by the occupant (e.g., during a seat adjustment performed by the occupant).

A stroke load of the seat is calculated based on the occupant weight determined from the load cell (block 1106). In particular, the stroke load is calculated based on an effective weight of the occupant to provide a proper amount of energy absorption during a potential impact. In some examples, the stroke load is calculated at least partially based on an available stroke of the seat and/or designed-to crash impact conditions. Additionally or alternatively, the stroke load is calculated based on the stroke position. Some examples of data tables used in these calculations are illustrated below in connection with FIGS. 13 and 14.

In this example, a seat energy absorber (e.g., the energy absorber 402) is set to the calculated stroke load (block 1108). For example, a servomotor controller (e.g., the servomotor controller 404) directs a motor assembly (e.g., the motor assembly 403) to adjust a respective energy absorber (e.g., the energy absorber 402) to the calculated stroke load. In some examples, the seat energy absorber is set to the calculated stroke load prior to takeoff of the aircraft.

Next, it is determined whether a potential/impending crash impact of the aircraft is detected (block 1110). For example, flight instrumentation/control systems of the aircraft such as the example vehicle management system 1014 may provide an alert/data related to a servomotor controller such as the servomotor controller 404 based on an impending impact and/or parameters (e.g., calculated parameters) pertaining to the detected and/or predicted impact.

If it is determined that an impact (e.g., an imminent impact) is not predicted to occur (block 1110), the process ends (block 1116). However, if it is determined that a potential impact is detected (block 1110), sensor data and/or predicted impact data are retrieved from a flight interface (e.g., the sensor interface 1010) by a seat controller such as the servomotor controller 404, for example (block 1112). Next, the stroke load is adjusted based on the sensor data and/or the predicted impact data (block 1114) and the process ends (block 1116). In some examples, the impact data is calculated and/or predicted based on current flight conditions.

Figure 12:
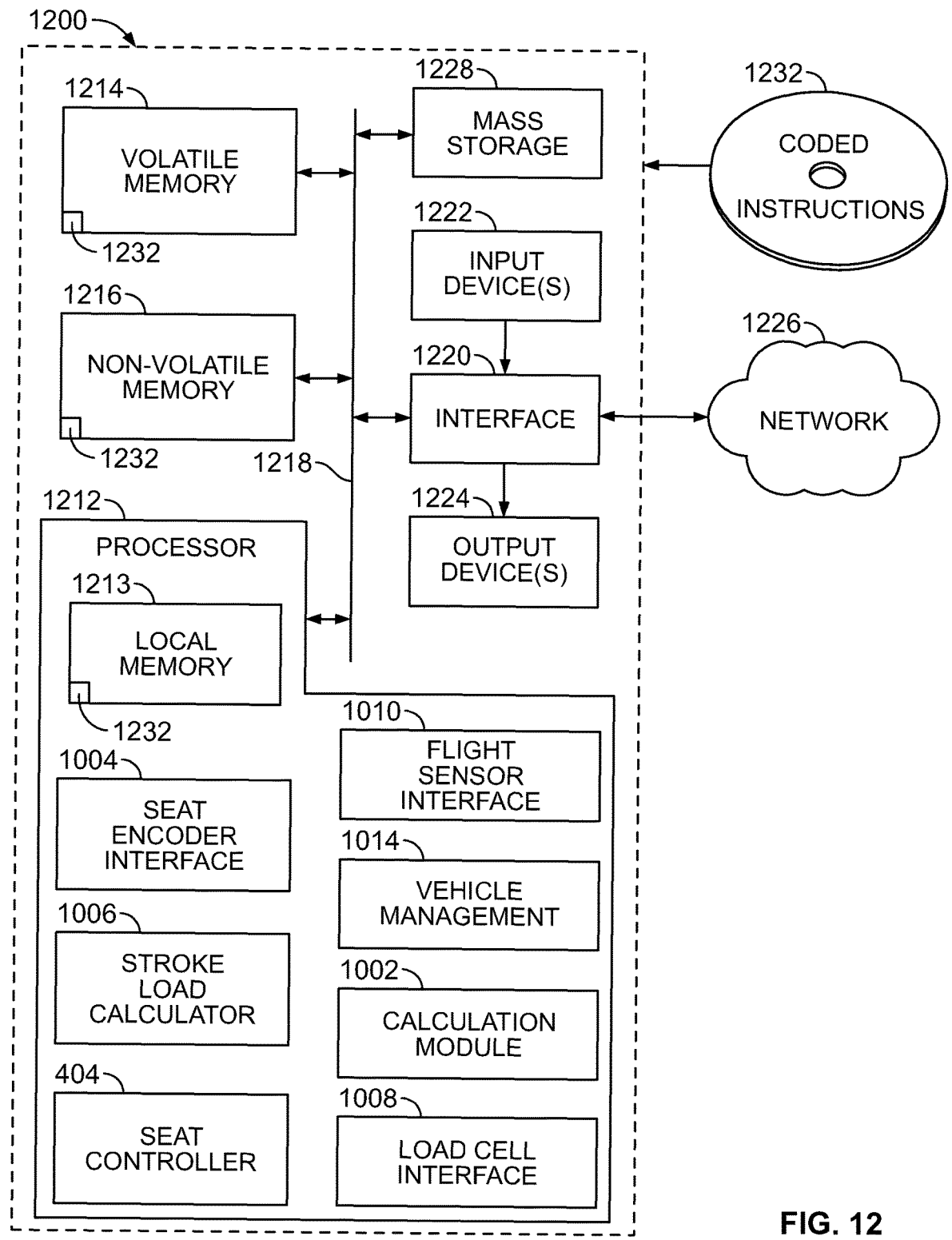
FIG. 12 is a block diagram of an example processor platform capable of executing machine readable instructions to implement the example method of FIG. 11.

FIG. 12 is a block diagram of an example processor platform 1200 capable of executing instructions to implement the example method of FIG. 11 to implement the seat control system 1000 of FIG. 10. The processor platform 1200 can be, for example, a server, a personal computer, a mobile device (e.g., a cell phone, a smart phone, a tablet such as an iPad™), a personal digital assistant (PDA), a personal video recorder, a set top box, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors or controllers from any desired family or manufacturer.

The processor 1212 of the illustrated example includes a local memory 1213 (e.g., a cache). The processor 1212 also includes the calculation module 1002, seat encoder interface 1004, the stroke load calculator 1006, the load cell interface 1008, the flight sensor interface 1010 and/or the vehicle management 1014. The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

Coded instructions 1232 to implement the method of FIG. 11 may be stored in the mass storage device 1228, in the volatile memory 1214, in the non-volatile memory 1216, and/or on a removable tangible computer readable storage medium such as a CD or DVD.

Figure 13:
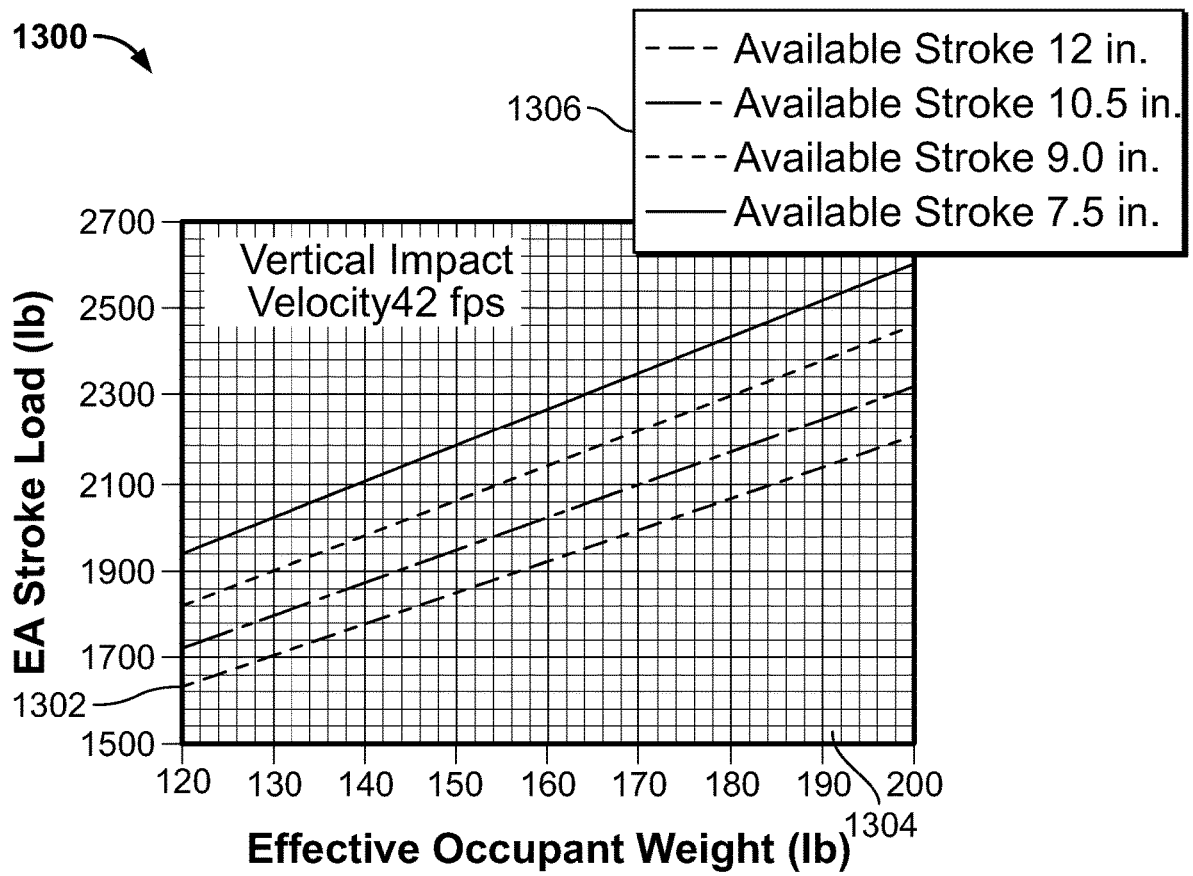
FIG. 13 is a graph representing an example data profile that may be used to determine a stroke load based on occupant weight.

FIG. 13 is a graph 1300 representing an example data profile that may be used to determine a stroke load based on occupant weight. In this example, the graph 1300 represents data related to a vertical crash impact of an aircraft at approximately 42 feet per second (fps). The graph 1300 has a vertical axis 1302 representing a stroke load of an energy absorber (e.g., a set stroke load) of a seat and a horizontal axis 1304 that represents an effective weight (e.g., a portion of a total weight of a person applied to the seat) of the occupant measured at the seat.

As can be seen in the graph 1300, increasing occupant weight results in higher stroke loads. In some examples, the stroke load is also varied based on available stroke, as can be seen by a legend 1306 of the graph 1300. In this example, there are multiple stroke load curves on the graph 1300 based on varying amounts of available stroke, which can be an indirect function of the occupant's height. The illustrated example graph 1300 depicts how occupant anthropometric data may be used to adjust the stroke load for greater effectiveness of energy absorbers. Further, the use of the effective weight instead of the total occupant weight, in some examples, may also be a more effective tailoring of the stroke load to the occupant.

While a 42 fps crash impact example is described above, data profiles corresponding to numerous other impact conditions not necessarily limited to impact velocity may be used (e.g., attitude of the aircraft, terrain topography and/or impact vector(s), etc.).

Figure 14:
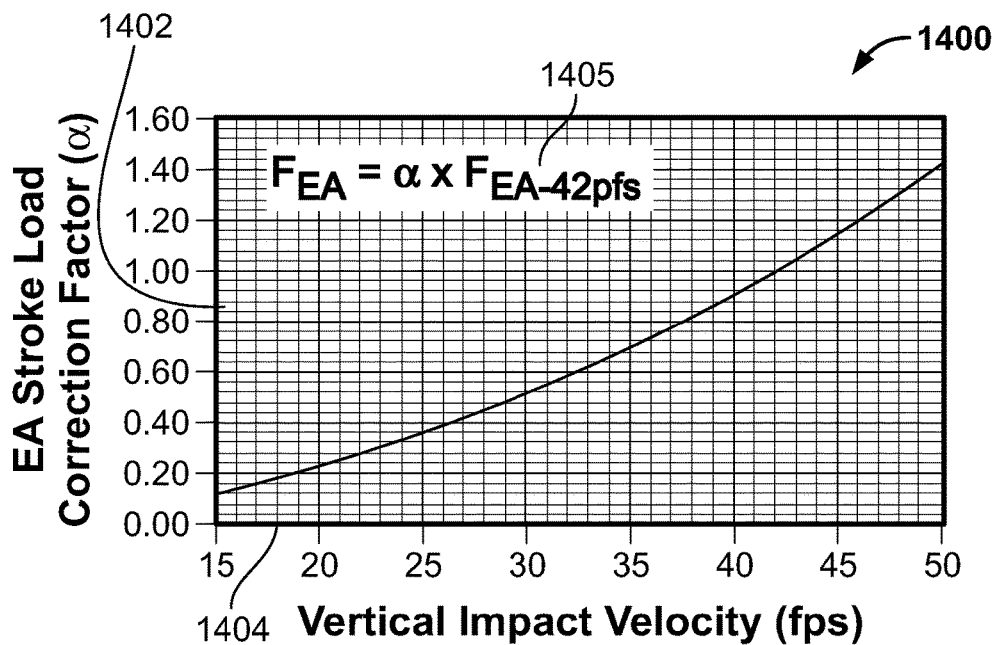
FIG. 14 is a graph representing an example data profile to adjust a stroke load based on predicted crash impact velocity.

FIG. 14 is a graph 1400 representing an example data profile to adjust a stroke load based on predicted crash impact velocity. The example graph 1400 includes a vertical axis 1402 that represents a correction factor (e.g., a scalar correction factor) used to adjust the stroke load based on a predicted impact velocity, which is represented by a horizontal axis 1404. The correction factor of the vertical axis 1402 is denoted by the symbol, α, and represented by equation 1405, which represents an example calculation of the correction factor based on an example 42 fps velocity crash impact baseline. This example data profile may be used in conjunction with the data profile described above in connection with FIG. 13 to determine/alter the stroke load. In some examples, the seat math model 918 of FIG. 9 may use tables using data represented by the examples of FIGS. 13 and 14 to calculate the stroke load.

From the foregoing, it will be appreciated that the above disclosed methods and apparatus enable more effective energy absorption/load control of vehicle seats, especially during a crash impact for example. In particular, the examples disclosed herein reduce the probability of applying too little or excessive stroke loads to an occupant of a vehicle seat by determining occupant-specific anthropometry to customize a stroke load based on individual occupant anthropometry to more effectively control energy to be absorbed by the vehicle seat.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While aircraft/vehicles are described in the examples disclosed herein, the examples disclosed herein may be applied to any other appropriate examples where seats are used to vary a transmitted load to a seat occupant.

What is claimed is:

1. A method comprising:
    determining, via a sensor, a weight of an occupant of a seat;
    calculating, using a processor, a height of the occupant based on an adjustment of a seat position by the occupant;
    predicting, using the processor, that an impact will occur;
    calculating, using the processor, impact conditions of the predicted impact;
    calculating, using the processor, a stroke load of a seat energy absorber operatively coupled to the seat based on the weight of the occupant, the height of the occupant and the impact conditions; and
    setting the seat energy absorber to the calculated stroke load prior to the impact.

2. The method as defined in claim 1, further including determining an available stroke of the seat, and wherein calculating the stroke load is further based on the available stroke.

3. The method as defined in claim 2, wherein the available stroke is determined based on an optical sensor.

4. The method as defined in claim 1, wherein setting the energy seat absorber includes adjusting, via an actuator, a length of the energy seat absorber.

5. The method as defined in claim 1, wherein the sensor is a first sensor, and further including a second sensor to detect an external condition of a vehicle in which the seat is disposed.

6. The method of claim 1, wherein the height of the occupant is calculated based on measurements from an optical sensor operatively coupled to the seat.

7. The method as defined in claim 1, wherein calculating the stroke load is further based on one or more of:
    terrain topography;
    velocity;
    acceleration;
    altitude; and
    weight.

8. The method as defined in claim 1, wherein the weight is determined by a load cell.

9. The method of claim 1, wherein calculating the impact conditions is based on terrain topography.

10. A tangible machine readable medium having instructions stored thereon, which when executed, cause a processor of a seat controller of a seat to:
    receive a weight of an occupant from a weight sensor of the seat;
    calculate a height of the occupant based on an adjustment of a seat position by the occupant;
    predict that an impact will occur based on a sensor that detects external conditions of a vehicle in which the seat is disposed; and
    calculate predicted impact conditions of the impact and a stroke load of an energy absorber operatively coupled to the seat based on the received weight, the calculated height and the predicted impact conditions.

11. The machine readable medium having instructions stored thereon as defined in claim 10, which when executed, further cause the processor to receive a relative position of a bucket of the seat from a position sensor mounted to the seat, wherein the stroke load is calculated further based on the relative position of the bucket.

12. The machine readable medium having instructions stored thereon as defined in claim 10, which when executed, further cause the processor to set the energy absorber to the calculated stroke load prior to the impact.

13. The machine readable medium having instructions stored thereon as defined in claim 12, wherein the predicted impact conditions are calculated based on:
    terrain topography;
    velocity;
    acceleration;
    altitude; and
    weight.

* * * * *